C. B. TRESCOTT.
PROCESS OF PICKLING MEATS.
APPLICATION FILED FEB. 10, 1912.
1,052,862.
Patented Feb. 11, 1913.
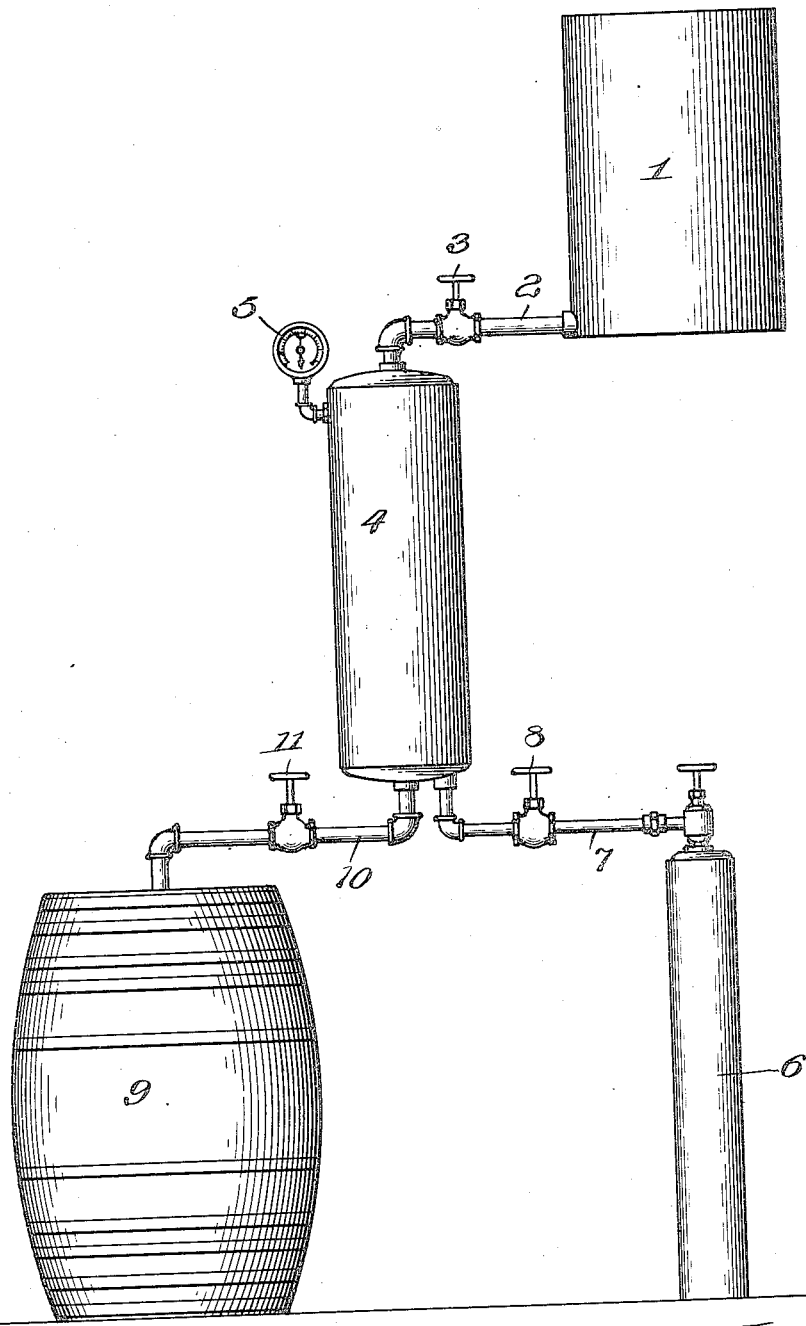
Witnesses:
Inventor:
Charles B. Trescott,

UNITED STATES PATENT OFFICE.

CHARLES B. TRESCOTT, OF INDIANAPOLIS, INDIANA, ASSIGNOR OF ONE-HALF TO JOSEPH ALLERDICE, OF INDIANAPOLIS, INDIANA.

PROCESS OF PICKLING-MEATS.

1,052,862.                  Specification of Letters Patent.      Patented Feb. 11, 1913.

Application filed February 10, 1912. Serial No. 676,846.

*To all whom it may concern:*

Be it known that I, CHARLES B. TRESCOTT, a citizen of the United States, residing at Indianapolis, in the county of Marion and State of Indiana, have invented a new and useful Improvement in Processes of Pickling Meats, of which the following is a specification.

My invention relates to an improvement in the art of producing salt meats (ham, bacon, beef, fish and other meats) by curing them in brine.

As is well known in the art, the "pickle" or brine is liable to become sour, and thus spoil the meat treated with it; and this tendency to souring is augmented, by fermentation, when sugar is added to the brine, as is commonly done in pickling the better grades of meat to impart desired flavor thereto.

The primary object of my invention is to counteract the souring tendency referred to, and this I accomplish by treating the pickle in the manner hereinafter described.

A further object of my invention is to improve, by way of supplementing, the process of Letters Patent No. 1,016,656, granted to me February 6, 1912, for a process of curing meats.

The accompanying drawing shows, by a view in the nature of a diagram, apparatus suitable for the practice of my improved process.

The supply of brine is made in an elevated tank 1 having a discharge-pipe 2 provided with a valve 3 and leading to a mixing tank 4, equipped with a pressure-gage 5. A drum 6 containing liquefied carbonic-acid gas is controllably connected with the lower part of the tank 4 by a pipe 7 containing a valve 8; and the mixing-tank is connected with a pickling-barrel or tank 9 by a pipe 10 provided with a valve 11.

After mixing the proper quantity of salt with water in the tank 1, the brine is run, upon opening the valve 3, into the tank 4 to fill the latter, whereupon that valve is closed and the valve 8 is opened to admit carbonic acid gas from the drum into the tank 4 to charge the brine therein with the gas, preferably with a high pressure, say, up to fifty pounds, though the pressure of the gas in the brine need not be higher, for the purpose of my process, than atmospheric. The carbonic acid gas content of the brine exerts its known preservative effect on the latter, preventing the development therein of the souring cause.

Where meat untreated by the process of my aforesaid patent, (namely without having its contained air supplanted by carbonic acid gas) is immersed in the pickle contained in the barrel 9, charged, as described, with carbonic-acid gas, it is preferable to have a high pressure of the gas in the brine, since otherwise the meat may absorb more or less of the gas out of the pickle and thereby reduce the quantity thereof below that required to maintain the immunity of the pickle to souring; whereas, with a super-abundant quantity of gas in the brine, such portion of the gas as enters the meat will not unduly rob the liquid and will, moreover, exert its preservative effect on the meat itself. Besides, and as another important advantage of highly charging the brine with the gas, the pressure of the latter expedites the curing action of the pickle on the meat inasmuch as it tends to force the salt more rapidly into the meat, and also to expedite penetration thereof by the gas to the innermost parts of the meat with the advantage of supplanting the air therein before putrefaction of the meat can begin. I intend it to be understood as being within my invention, however, to cure meat by submerging it for the proper length of time in carbonated brine pickle of a specific gravity greater than that of sea-water.

When the pickle, without being charged with carbonic-acid gas, is used on meat preparatorily treated by the process of my aforesaid patent, it is found that it tends to extract from the meat more or less of its contained gas, and thus acts detrimentally to the process, to the extent of such extraction. It is, therefore, desirable in the practice of the patented process, to prevent any material loss of the carbonic-acid gas from the meat impregnated therewith, and this object is effectively accomplished by charging the brine with carbonic acid gas to any desirable pressure thereof preparatory to immersing the meat in it; and then, if it be desired to expedite the curing action, it is best to charge the brine with a high degree of pressure for the reason hereinbefore stated.

What I claim as new and desire to secure by Letters Patent is—

1. The process of curing meat, which consists in preparing a brine pickle of a specific gravity greater than that of sea-water, charging said pickle with carbonic-acid gas and immersing in and subjecting to the action of the charged pickle the meat to be cured.

2. The process of curing meat, which consists in preparing a brine pickle of a specific gravity greater than that of sea-water, charging said pickle with carbonic-acid gas to a pressure materially exceeding atmospheric pressure, and immersing in and subjecting to the action of the pickle so charged the meat to be cured.

3. The process of curing meat, which consists in driving out its contained air and supplanting such air with carbonic acid gas, and subjecting the charged meat to the pickling action of brine charged with carbonic acid gas.

4. The process of curing meat, which consists in driving out its contained air and supplanting such air with carbonic acid gas, and subjecting the charged meat to the action of a brine pickle charged with carbonic acid gas to a pressure-content thereof materially exceeding atmospheric pressure.

CHARLES B. TRESCOTT.

In presence of—
L. HEISLAR,
R. SCHAEFER.